United States Patent [19]

Teramachi

[11] Patent Number: 4,692,039
[45] Date of Patent: * Sep. 8, 1987

[54] RECIRCULATING-BALL LINEAR BEARING AND GUIDE RAIL THEREFOR

[76] Inventor: Hiroshi Teramachi, 2-34-8, Higashi-Tamagawa, Setagaya-ku, Tokyo, Japan

[ * ] Notice: The portion of the term of this patent subsequent to Jun. 17, 2003 has been disclaimed.

[21] Appl. No.: 465,646

[22] Filed: Feb. 10, 1983

[30] Foreign Application Priority Data

Feb. 25, 1982 [JP] Japan .................................. 57-29454

[51] Int. Cl.⁴ ........................ F16C 29/00; F16C 29/06
[52] U.S. Cl. ......................................... 384/45; 384/49
[58] Field of Search ........................ 308/6 C, 6 R, 3.5

[56] References Cited

U.S. PATENT DOCUMENTS

| 2,992,620 | 7/1961 | Cherkas | 308/6 R |
| 4,253,709 | 3/1981 | Teramachi | 308/6 C |
| 4,273,389 | 6/1981 | Takai | 308/6 C |
| 4,296,974 | 10/1981 | Teramachi | 308/6 C |

Primary Examiner—Stuart S. Levy
Assistant Examiner—Thomas R. Hannon
Attorney, Agent, or Firm—Armstrong, Nikaido, Marmelstein & Kubovcik

[57] ABSTRACT

A combination of a guide rail and a linear bearing mounted astraddle thereon for linear rolling movement. The guide rail is of T-shaped cross section, having a head on both sides of which there are formed two pairs of parallel ball raceways of arcuate cross section, with each pair of raceways vertically spaced and angled away from each other. The linear bearing includes a body of inverted-U-shaped cross section having two pairs of ball raceways of arcuate cross section formed on its inner surfaces in opposed relation to the two pairs of raceways on the guide rail. A ball return passageway extends longitudinally through the bearing body in the adjacency of each raceway thereon. Fastened to the opposite ends of the bearing body, a pair of segmented end covers have hairpin grooves formed in their inside surfaces, each hairpin groove intercommunicating one raceway on the bearing body and one adjacent return passageway therein to allow recirculation of a group of antifriction balls. A pair of cages extend along the respective pairs of raceways on the bearing body for rollably holding the antifriction balls thereon. The cages are slotted to permit the balls to project therethrough for rolling engagement with the raceways on the guide rail.

14 Claims, 23 Drawing Figures

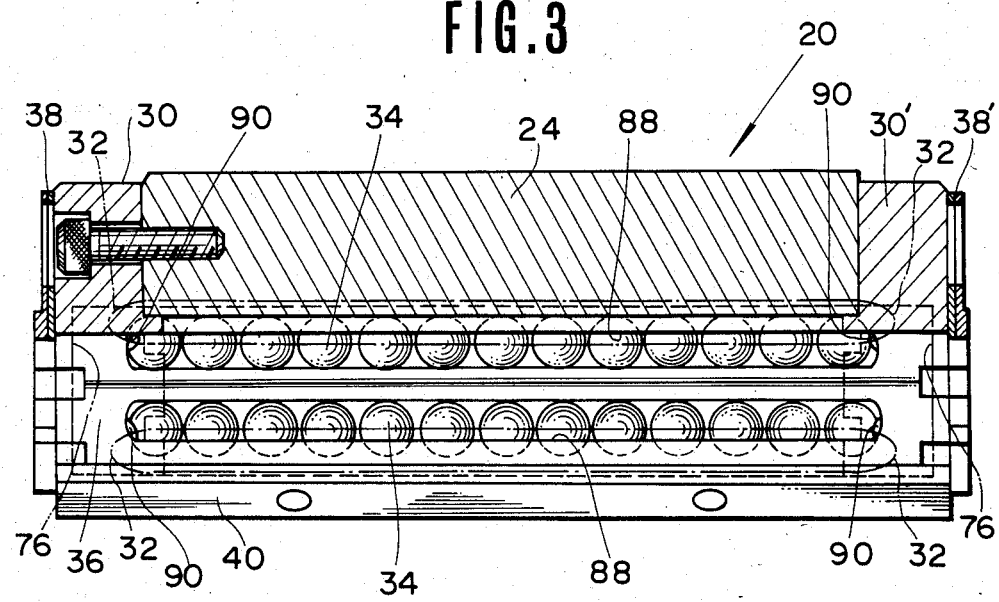
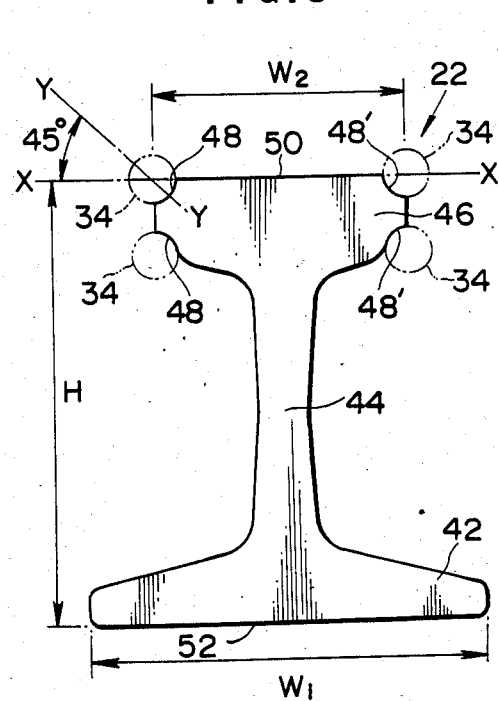
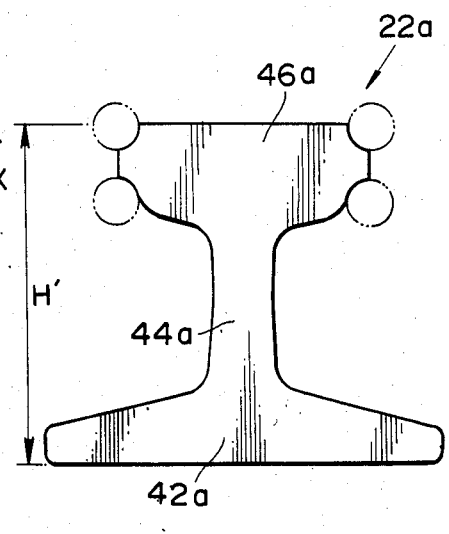

FIG.15
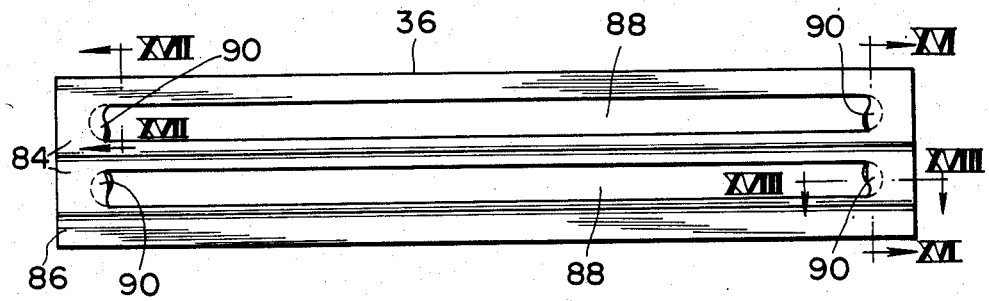
FIG.16
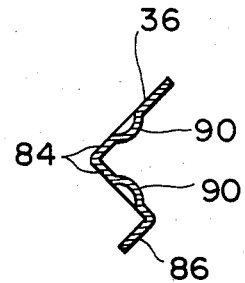
FIG.17     FIG.18
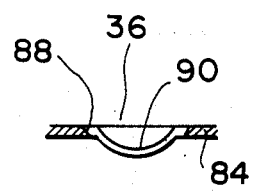 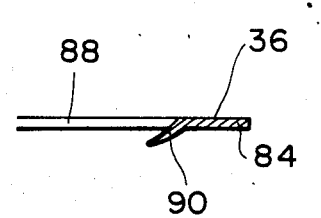

RECIRCULATING-BALL LINEAR BEARING AND GUIDE RAIL THEREFOR

BACKGROUND OF THE INVENTION

This invention deal with the combination of a linear bearing and a guide rail therefor, for use in moving an object along a rectilinear path with a minimum of friction. More specifically the invention is directed to such linear bearing apparatus of the type incorporating groups of recirculating antifriction balls and wherein the direction of action of the load transmitted can be either downward, upward, or opposite lateral directions. The linear bearing apparatus according to the invention finds applications in machine tools, machining centers, and a variety of other pieces of machinery or equipment wherein one part is to be moved linearly relative to another.

Japanese Patent Laying-Open No. 55-72912, filed by the assignee of the instant application, discloses linear bearing apparatus of the type in question. It comprises a bearing body of inverted-U-shaped cross section mounted astride a guide rail via groups of recirculating antifriction balls for rolling movement thereon. Although this prior art apparatus can largely well accomplish the purposes for which it is intended, it has proved to have certain problems in connection with the guide rail and some other components.

In the noted prior art apparatus the guide rail takes the form of a heavy beam of approximately square section. The guide rail of this construction does not necessarily lend itself to combined used as a structural member, such as a beam or girder, of a building or as a framing member of a machine or equipment. Discussed hereinbelow are the reasons for this.

As the load on the linear bearing acts thereon in various possible directions, the forces are transmitted directly to the guide rail supporting the bearing. The guide rail must therefore be of sufficient rigidity to remain undeformed by such stresses. For use as a structural or framing member, moreover, the guide rail must also withstand bending and twisting forces. The known guide rail meets those requirements to some extent solely by virtue of its great cross sectional size. This conventional solution makes it impossible to use the guide rail as a beam or girder mounted on discontinuous supports, for the guide rail would sag between the supports under its own weight. The deformation of the guide rail is a serious impediment to the proper rolling of the linear bearing thereon. Thus the known linear bearing apparatus has been limited as to its places of installation.

Another problem concerns a pair of end covers fastened to the opposite ends of the bearing body to provide parts of the closed paths for the recirculation of the antifriction balls. The end covers in the prior art apparatus have been each integrally molded of plastics material. The one-piece molding of each end cover is objectionable because of its complex shape. Having approximately the cross sectional shape of the bearing body, the end covers have formed therein not only curved grooves serving as parts of the closed ball paths but also annular depressions and other recesses. Much difficulties have been involved in the production of molds for such complex shapes and in the control of the heat and pressure conditions for the molding of the end covers therein. Some errors in the dimensions of the molded end covers have therefore been almost unavoidable, resulting in the hindrance of the smooth rolling of the balls through the curved grooves in the end covers. The manufacture of such unitary end covers has also been very time-consuming and so added considerably to the cost of the complete bearing.

A further problem with the prior art linear bearing apparatus relates to a unitary cage rollably holding the antifriction balls on raceways formed on the inside surfaces of the bearing body. Generally horseshoe-shaped in cross section to fit the interior contours of the bearing body, the cages has slots formed longitudinally therein to allow the balls to make rolling engagement with raceways on the guide rail. The cage is fabricated from sheet steel of means of a press. By reason of the complex shape of the cage, however, it has been difficult to create the slots in exact positions thereon. Difficulties have also been encountered in withdrawing the punches from the slots as they are formed in sloping parts of the cage.

The unitary construction of the conventional cage has also tended to give rise to its dimensional errors and mounting errors. Such errors make it impossible to rigidly hold the cage relative to the bearing body and other pertinent parts of the bearing. Thus the manufacture of linear bearings of any great longitudinal dimension has been virtuelly inhibited. Further the unitary cage with the dimensional or mounting errors has been easy to deflect or become displaced under load, impeding the proper rolling of the antifriction balls and, in consequence, the proper movement of the bearing along the guide rail with a minimal rolling friction.

SUMMARY OF THE INVENTION

The present invention seeks, in recirculating-ball linear bearing apparatus of the type under consideration, to make the guide rail lighter in weight and greater in strength and rigidity for widening its field of possible installations.

The invention also seeks to make easier the fabrication of the pair of end covers and the cage to close tolerances by segmenting or splitting them and hence to reduce the manufacturing cost of the linear bearing while assuring the smooth, aligned rolling of the balls under load.

The invention also seeks to enhance the rigidity of the cage segments for making possible the provision of linear bearings of greater longitudinal dimension than heretofore.

The invention also seeks to expedite the assemblage of the linear bearing by providing a simplified means for retaining the cage segments in position.

Stated in brief, the invention provides an improved combination of a recirculating-ball linear bearing and a guide rail therefor. The guide rail is of substantially T- or I-shaped cross section integrally comprising a flat flange base, a web extending upwardly from the flange base, and a head on the top of the web. The guide rail has two pairs of parallel ball raceways of arcuate cross section formed longitudinally on both sides of its head, with each pair of raceways vertically spaced and angled away from each other. The linear bearing, on the other hand, comprises a body of substantially inverted-U-shaped cross section mounted astride the guide rail for rolling motion thereon. The bearing body has two pairs of ball raceways of arcuate cross section formed longitudinally thereon in opposed relation to the two pairs of raceways on the guide rail, and ball return passageways formed longitudinally therethrough in the adjacency of the respctive raceways thereon. Attached to the opposite ends of the bearing body, a pair of end covers have formed therein for hairpin grooves each intercommunicating one raceway on the bearing body and one adjacent return passageway in the bearing body. Thus are formed closed paths for the recirculation of respective groups of antifriction balls. The linear bearing further comprises cage means for rollably holding the antifriction balls on the raceways on the bearing body.

The guide rail of T- or I-shaped cross section in comparatively light in weight but nevertheless has sufficient rigidity and strength to bear the load to be carried by the linear bearing, in spite of the various directions of action of the load to be transmitted. The lightness of the guide rail makes it suitable for combined use as a framing or structural member of a machine tool or in other installations where the guide rail must be partly supported in midair.

According to a further feature of the invention the pair of end covers are each segmented into a pair of lateral halves. Further the cage means comprises a pair of discrete cages each extending along one pair of raceways on the bearing body. Each cage is in the form of a strip of steel or like rigid material bent into the shape of a V in cross section to provide a pair of divergent web portions. Each web portion has a slot formed longitudinally therein to allow the antifriction balls on one raceway on the bearing body to partly project therethrough into rolling engagement with the corresponding one of the raceways on the guide rail.

The pair of segments of each end cover are of course each much smaller in size and simpler in shape than the conventional end cover of one-piece construction. The production of the molds for the end cover segments, and the molding of these segments therein, are therefore both far easier than hitherto. Molded in exact dimensions specified, the pair of segmented end covers with the hairpin grooves therein contribute materially to the smooth recirculation of the antifriction balls. The easier fabrication of the end covers also serves to reduce the manufacturing cost of the recirculating-ball linear bearing.

It will also be appreciated that the production of the separate cages by the pressing of sheet metal is much easier and less time-consuming than if they are integral, thus also contributing to the cost reduction of the linear bearing. Further, since the separate cages are manufacturable to very close tolerances, they help to make smoother the rolling of the antifriction balls between the bearing body and the guide rail under load.

Preferably each cage has a flange extending along at least one side thereof for higher rigidity. Thus the pair of cages are both of Z-shaped cross section in a preferred embodiment disclosed herein. The improved rigidity of the cages make it possible to increase the longitudinal dimension of the linear bearing as required. The cages of Z-shaped cross section, moreover, can be firmly mounted in position simply as their opposite ends are engaged in retainer grooves of corresponding shape formed in the pair of end covers. This feature greatly expedites the assemblage of the linear bearing.

The above and other features and advantages of this invention and the manner of attaining them will become more apparent, and the invention itself will best be understood, from a study of the following description of the preferred embodiment and the appended claims, with reference had to the attached drawings.

BRIEF DESCRIPTION OF THE DRAWINGS

FIG. 3 is a longitudinal section through the linear bearing proper, taken along the line III—III of FIG. 1, the view not showing the guide rail to clearly reveal the inside details of the linear bearing;

FIG. 6 is an end elevation of the guide rail in the linear bearing apparatus of FIG. 1;

FIG. 7 is an end elevation of a slight modification of the guide rail of FIG. 6;

FIG. 15 is an elevation of one of the pair of cages of the linear bearing in the apparatus of FIG. 1;

FIG. 16 is a transverse section through the cage, taken along the line XVI—XVI of FIG. 15;

FIG. 17 is a fragmentary, transverse section through the cage, taken along the line XVII—XVII of FIG. 15;

FIG. 18 is a fragmentary, longitudinal section through the cage, taken along the line XVIII—XVIII of FIG. 15;

DESCRIPTION OF THE PREFERRED EMBODIMENT

General

Figure 1:
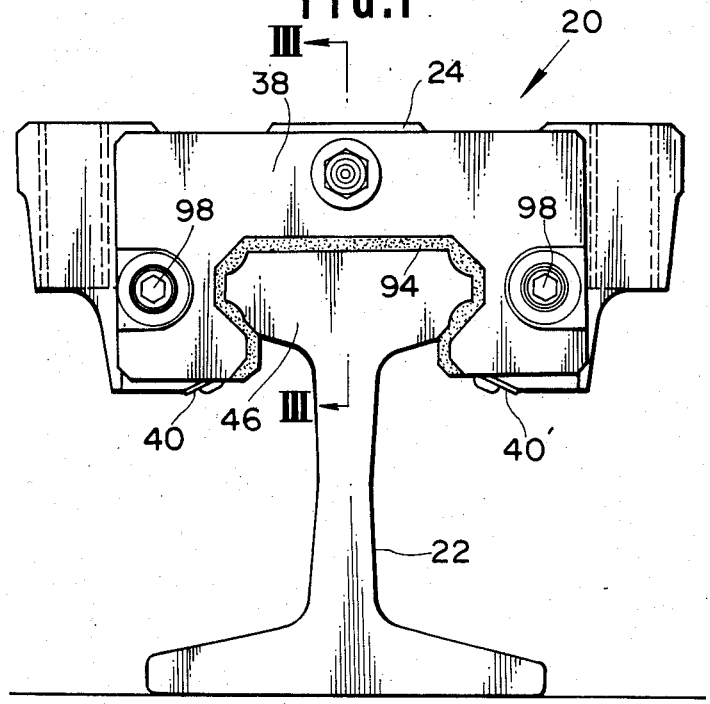
FIG. 1 is an end elevation of the recirculating-ball linear bearing apparatus embodying the principles of this invention, the apparatus comprising a linear bearing proper and a guide rail therefor, both of which are shown herein in their relative working positions.
Figure 2:
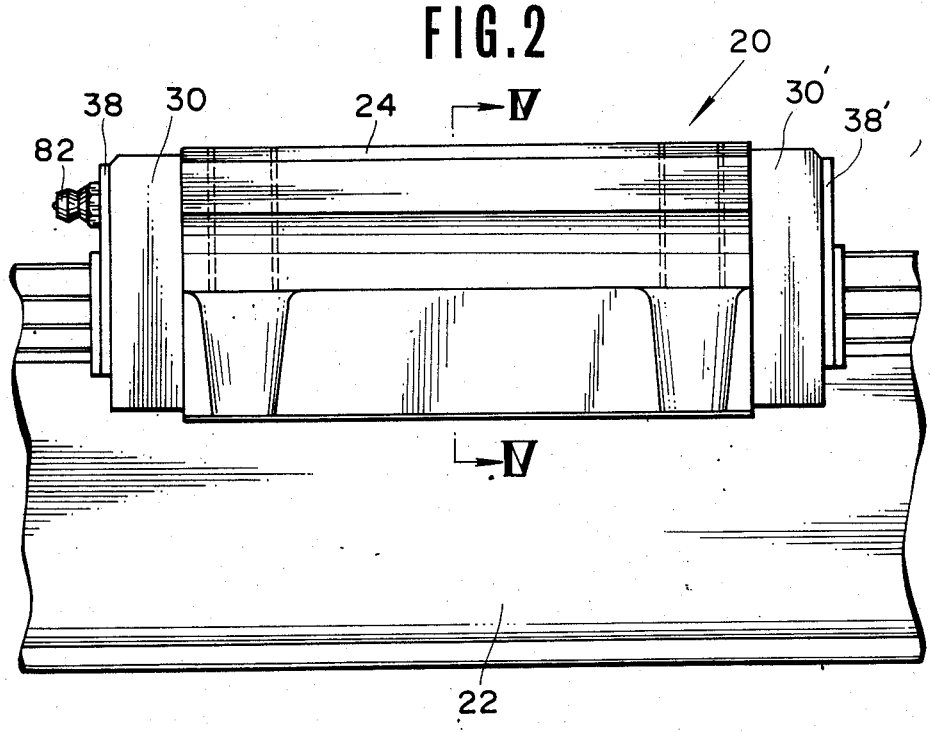
FIG. 2 is a right hand side elevation of the linear bearing apparatus of FIG. 1.

The recirculating-ball linear bearing apparatus of this invention is the combination of a linear bearing proper 20 and a guide rail 22 shown in FIG. 1. Placed astride the guide rail 22, the linear bearing 20 is to roll in either direction thereon. In the use of the apparatus the linear bearing 20 is to be attached to a desired object to be moved linearly relative to a part to which the guide rail 22 is secured.

With particular reference to FIGS. 1 to 5 the linear bearing 20 broadly comprises:

1. A body 24 substantially in the shape of an inverted U in cross section having two opposed pairs of ball raceways 26 and 26', FIG. 4, of arcuate cross section formed longitudinally on its inside surfaces, and two associated pairs of ball return passageways 28 and 28' extending longitudinally therethrough in the vicinity of, and parallel to, the respective pairs of ball raceways 26 and 26'.

2. A pair of segmented end covers 30 and 30', each of substantially the same shape and size as the cross section of the bearing body 24, screwed or otherwise fastened to the opposite ends of the bearing body, each end cover having four hairpin grooves 32 and 32', FIGS. 3 to 5, formed in its inside surface each for intercommunicating one ball raceway 26, 26' and one adjacent ball return passageway 28, 28' as in FIG. 5.

3. Four groups of rolling antifriction balls 34 capable of recirculating through the respective closed paths formed by the four raceways 26 and 26' on the bearing body 24, the four return passageways 28 and 28' in the bearing body, and the four hairpin grooves 32 and 32' in each cover 30, 30'.

4. A pair of cages 36 an 36', FIGS. 3 to 5, each extending along one pair of raceways 26, 26' on the bearing body 24 for rollably holding the antifriction balls 34 thereon in a manner allowing their rolling engagement with the guide rail 22.

5. A pair of end seals 38 and 38' for preventing the intrusion of dust and other foreign matter into the linear bearing through its opposite ends.

6. A pair of side seals 40 and 40' for preventing the intrusion of dust and other foreign matter into the linear bearing through its opposite sides.

The guide rail 22 and all but the antifriction balls 34 of the listed components of the linear bearing 20 will be discussed in further detail hereinbelow under the respective headings.

Guide Rail

As shown by itself in FIG. 6, the guide rail 22 can be of the type commonly known as the T or I rail. It integrally comprises a flat flange base 42, an upstanding web 44 on the flange base, and a head 46 on the top of the web. The flange base 42 is intended to be bolted or otherwise secured to a desired, normally stationary, part of a machine or the like, whereas the head 46 is intended for direct engagement with the linear bearing 20. The width W1 of the flange base 42 is greater than the width W2 of the head 46 so that the flange base may be firmly attached to a desired part.

Formed on both sides of the head 46 of the T-section guide rail 22 and extending longitudinally thereof are two pairs of ball raceways 48 and 48' for relative rolling engagement with the respective groups of antifriction balls 34 on the corresponding pairs of ball raceways on the bearing body. Each pair of raceways 48, 48' extend in vertically spaced, parallel relation to each other. As viewed cross-sectionally, or in an end view as in FIG. 6, each raceway is curved with a radius approximately equal to that of each antifriction ball 34. It will be seen that each pair of raceways are angled away from each other.

Further the plane Y—Y passing the longitudinal median line of each raceway 48, 48' and the centers of the antifriction balls 34 in rolling engagement therewith are at an angle of 45 degrees to the plane X—X of the horizon, to which there are laid parallel the top 50 and bottom 52 surfaces of the guide rail. To turn this statement around is to say that the planes passing the longitudinal median lines of the four raceways 48 and 48' on the guide rail 22 and the centers of the antifriction balls 34 thereon are angularly spaced 90 degrees from each other. With the raceways on the guide rail thus angled relative to each other, and with the raceways 26 and 26' on the bearing body 24 angled correspondingly, the linear bearing apparatus can most effectively bear the load acting thereon in all of upward, downward, rightward and leftward directions.

In FIG. 7 is given another guide rail 22a alternative to the guide rail 22 of FIG. 6. The alternative guide rail 22a differs from the guide rail 22 in having a height H' considerably less than the height H of the FIG. 6 guide rail. The cross section of this alternative guide rail may therefore be thought of as being in the shape of a recumbent H.

The reduced height of the guide rail 22a comes from the reduced height of its web 44a. The flange base 42a and head 46a of the guide rail 22a are approximately equal in size and shape to the flange base 42 and head 46 of the guide rail 22. The arrangement of the four ball raceways on the head 46a, and their angular orientations, are as set forth above in connection with FIG. 6.

Bearing Body

Figure 8:
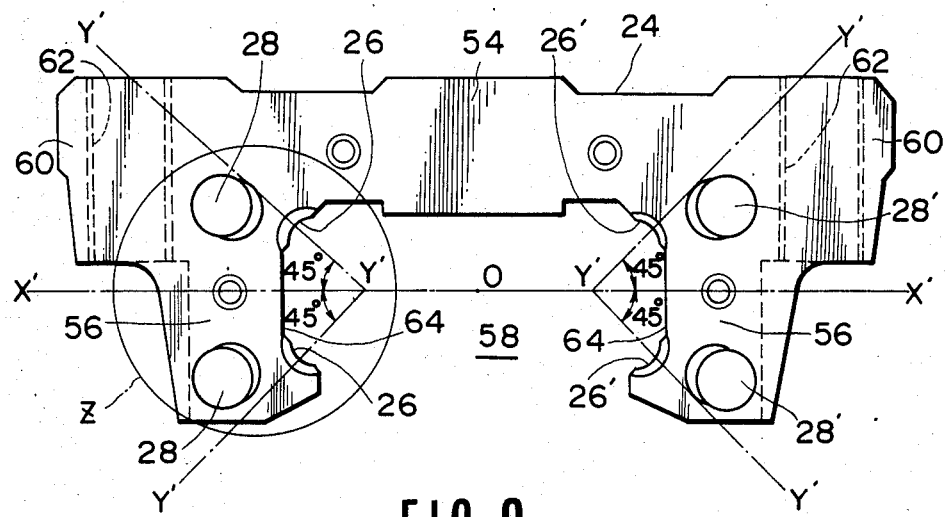
FIG. 8 is an end elevation of the body of the linear bearing in the apparatus of FIG. 1.
Figure 9:
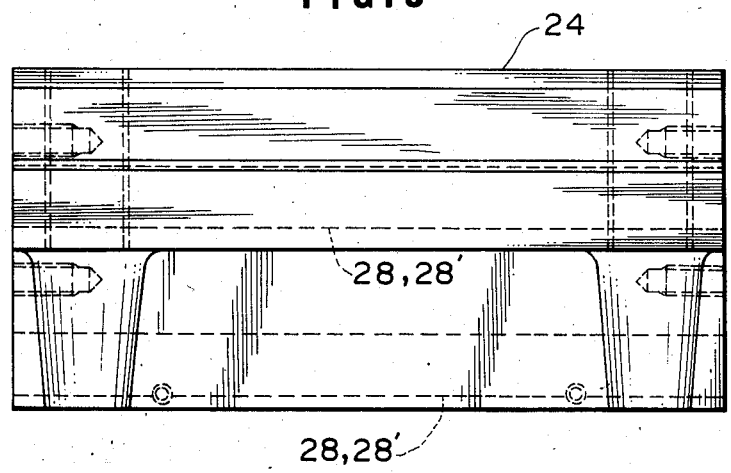
FIG. 9 is a side elevation of the body of the linear bearing shown in FIG. 8.
Figure 10:
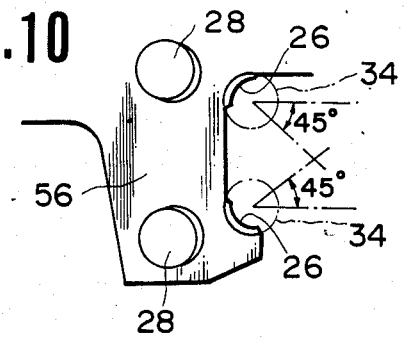
FIG. 10 is a fragmentary end elevation of that part of the linear bearing body which is shown enclosed in the circle designated Z in FIG. 8.

FIGS. 8 to 10 are detailed representations of the body 24 of the linear bearing 20. It comprises a generally flat bridge portion 54 to be laid horizontally over the guide rail 22, and a pair of aprons 56 depending from the opposite sides of the bridge portion throughout its length. The bridge portion 54 and the pair of aprons 56 may be considered to bound in combination a generally rectangular space designated 58 in FIG. 8. The bearing body 24 further includes a pair of wings 60 projecting from its opposite sides. The wings 60 have each a suitable number of mounting holes 62 formed vertically therethrough. These mounting holes are intended for use in attaching the bearing body to the object to be moved along the guide rail, by means of screws or other fastener elements passing therethrough.

The pair of aprons 56 of the bearing body 24 have recesses 64 formed in their opposed inside surfaces, each recess extending throughout the length of the body and being approximately trapezoid in cross sectional shape. The noted two pairs of ball raceways 26 and 26' are each arranged on both sides of one of the recesses 64. Thus each pair of raceways 26, 26' are vertically spaced from and parallel to each other. Also, like the raceways on the guide rail, each raceway 26, 26' on the bearing body is curved with a radius approximately equal to that of each antifriction ball to roll thereon, as viewed cross-sectionally or in an end view as in FIGS. 8 and 10.

It will also be observed from FIG. 8 that each pair of raceways 26, 26' on the bearing body 24 are arranged in bilateral symmetry with respect to a horizontal plane X'—X' passing the geometric center O of the aforesaid space 58 bounded by the bearing body 24. Further, as will be noted from FIGS. 8 and 10, the planes Y'—Y' passing the longitudinal median lines of the four raceways 26 and 26' and the centers of the antifriction balls 34 thereon are all at an angle of 45 degrees to the horizontal plane X'—X'.

Figure 4:
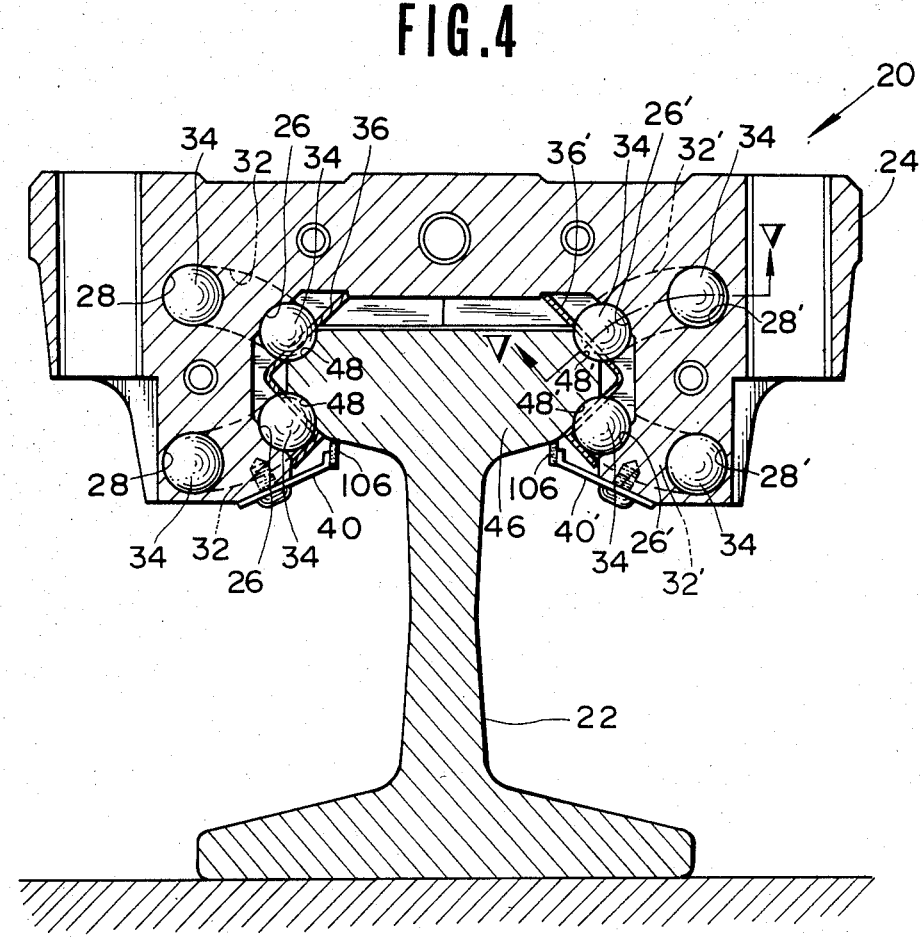
FIG. 4 is a transverse section through the linear bearing apparatus, taken along the line IV—IV of FIG. 2.

When the bearing body 24 is mounted astraddle on the guide raill 22 via the groups of antifriction balls 34, as best depicted in FIG. 4, the two pairs of raceways 26 and 26' on the bearing body lie in opposed relation to the two pairs of raceways 48 and 48' on the guide rail. The above arrangement of the raceways on the guide rail and on the bearing body enables the linear bearing apparatus to most effectively bear the load despite the various directions of its action transmitted.

FIG. 8 also clearly reveals the placement of the two pairs of ball return passageways 28 and 28' extending longitudinally through the bearing body 24, or through its aprons 56. The diameter of each ball return passageway is made somewhat greater than that of each antifriction ball 34 in order that the balls may travel therethrough with minimal resistance. Each pair of return passageways 28, 28' lie in position of bilateral symmetry with respect to the horizontal plane X'—X'.

While each pair of return passageways 28, 28' are more spaced from each other than are each pair of raceways 26, 26' on the bearing body, nonetheless it will be seen that they are located inwardly of the planes Y'—Y' pasing the longitudinal median lines of the associated pair of raceways 26, 26' and the centers of the antifriction balls 34 thereon. This arrangement makes it possible to correspondingly reduce the vertical dimension of the bearing body 24 without appreciably affecting its strength or rigidity. The bearing body with its reduced vertical dimension possesses greater stability against load forces, particularly against those applied in its transverse direction.

It should also be appreciated that the pair of aprons 56 of the bearing body have each a very substantial thickness or transverse dimension. Thus, even though the two pairs of return passageways 28 and 28' lie mostly in the aprons 56, they do not suffer any significant decrease in rigidity or strength. The great thickness of the aprons serves to enhance their rigidity and hence to prevent their outward deformation under load.

End Covers

FIGS. 11 to 14 illustrate in detail one of the pair of segmented end covers 30 and 30' fastened to the opposite ends of the bearing body 24. Since both end covers are of identical make, only one of them, 30, will be described in detail, it being understood that the same description applies to the other end cover 30'.

Figure 11:
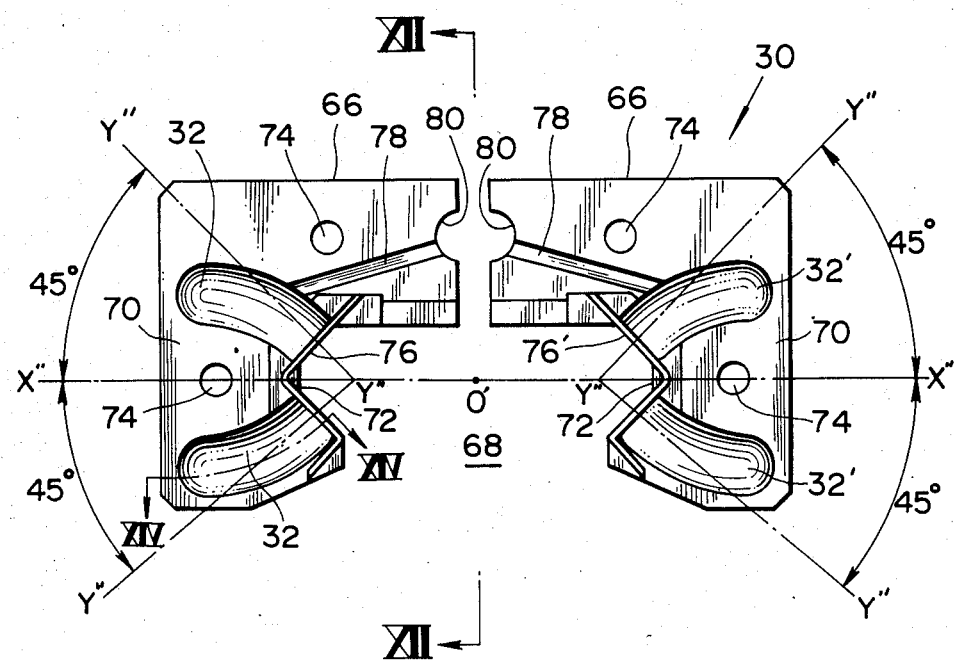
FIG. 11 is an elevation showing the inside surface of one of the pair of segmented end covers of the linear bearing in the apparatus of FIG. 1.

With particular reference to FIG. 11, which shows the inner surface of the representative end cover 30, it will be recognized that the end cover is split into a pair of lateral halves or segments 66. The end cover segments are separately fabricated as by the injection molding of a synthetic resin or by the die casting of a metal or alloy. Each end cover segment is substantially in the shape of an L. In combination the two segments make up the inverted U-shaped end cover 30. While the end cover is approximately of the same shape and size as the cross section of the bearing body 24, the inside edges of the end cover, bounding a generally rectangular space 68, particularly closely correspond in shape to the inside surfaces of the bearing body as viewed cross sectionally. Thus the pair of depending portions 70 of the end cover have recesses 72 cut in their opposed inner edges. These recesses correspond to the recesses 64, FIG. 8, in the bearing body 24. Holes 74 in the end cover 30 are intended for the passage of fastener elements for use in attaching the end cover to the bearing body.

Figure 5:
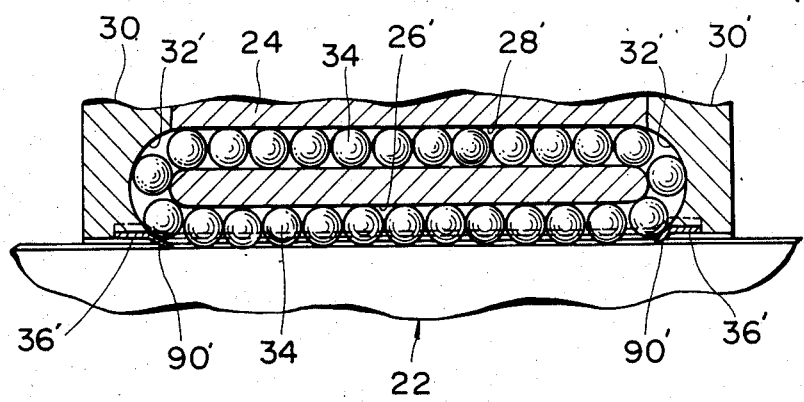
FIG. 5 is a fragmentary section through the linear bearing proper, taken along the line V—V of FIG. 4, the view showing in particular one of the closed paths for the recirculation of antifriction balls.

Formed in the inner face of the end cover 30, which makes dirct contact with one of the end faces of the bearing body 24, are the two pairs of hairpin grooves 32 and 32' intercommunicating the ball raceways 26 and 26' on the bearing body and the ball return passageways 28 and 28' therein in the manner best pictured in FIG. 5. The hairpin grooves 32 and 32' are curved not only in the plane of FIG. 5 but also in a plane at right angles therewith, as in FIG. 11.

As viewed in FIG. 11, each pair of hairpin grooves 32, 32' are bilaterally symmetrical with respect to the horizontal plane X"—X" passing the center O' of the space 68 bounded by the inner edges of the end cover 30. This plane X"—X" coincides with the aforesaid plane X'—X' of FIG. 8. A line Y"—Y" tangent to each hairpin groove 32, 32' at its end in communication with one of the ball raceways on the bearing body is at an angle of 45 degrees to the horizontal plane X"—X". Extending from this end toward the other, each hairpin groove rather gently curves toward the horizontal plane X"—X" and terminates at the point where it communicates with one of the ball return passageways 28 and 28' in the bearing body.

The foregoing will have made clear that each hairpin groove 32, 32' in the end cover 30 has its opposite ends in communication with one extremity of one ball raceway 26, 26' on the bearing body and with one extremity of one ball return passageway 28, 28' in the bearing body, thus serving as a hairpin curve therebetween. The other extremities of the ball raceways and the ball return passageways are of course understood to be likewise intercommunicated via similar hairpin grooves in the other end cover 30'. Accordingly each ball raceway on the bearing body and one adjacent ball return passageway therein, in combination with two associated hairpin grooves in the end covers, make up a closed path, as in FIG. 5, for the recirculation of one group of antifriction balls.

Figure 12:
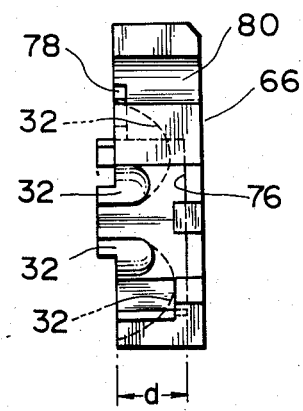
FIG. 12 is a section taken along the line XII—XII of FIG. 11 and showing one of the end cover segments in side elevation.
Figure 13:
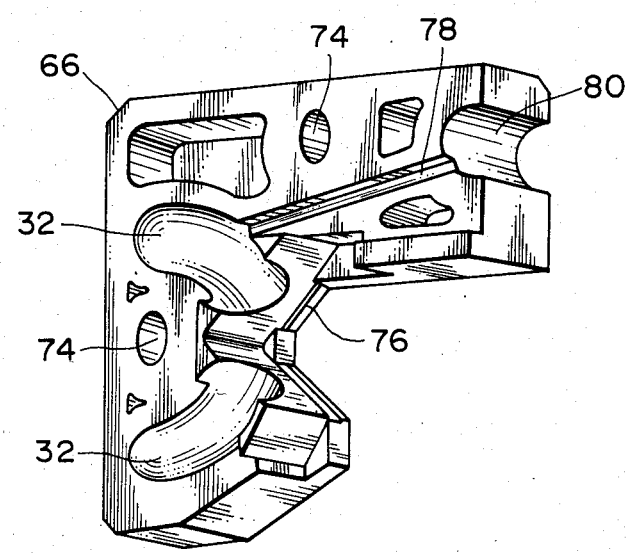
FIG. 13 shows in perspective and on an enlarged scale one of the end cover segments of FIGS. 11 and 12.
Figure 14:
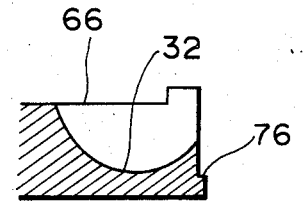
FIG. 14 is a fragmentary section through one of the end cover segments, taken along the line XIV—XIV of FIG. 11.

The representative end cover 30 of FIGS. 11 to 13 has also a pair of retainer grooves 76 and 76' formed in its inner face. Intended to closely receive one of the opposite longitudinal ends of one of the cages 36 and 36', each retainer groove 76, 76' has the exact cross sectional shape of each cage. The cross sectional shape of the cages 36 and 36' is yet to be studied. The shape of each retainer groove will also become clear from the subsequent discussion of the cages. For the moment, therefore, suffice it to say that the retainer grooves 76 and 76' have portions extending across the respective pairs of hairpin grooves 32 and 32' at their ends lying next to the ball raceways on the bearing body. As indicated in FIG. 12, the retainer grooves 76 and 76' have a depth d considerably more than half the thickness of the end cover 30.

At 78 are shown a pair of grooves extending from semicircular recesses 80 in the opposed inner edges of the end cover segments 66 to the upper hairpin grooves 32 and 32'. These grooves 78 serve to direct grease into the ball paths of the bearing. The recesses 80 combine to form a hole for the reception of a grease nipple seen at 82 in FIG. 2.

Cages

FIGS. 15 to 18 are detailed representations of one of the pair of cages 36 and 36' for guiding the antifriction balls 34 as they roll between the raceways 26 and 26' on the bearing body and the raceways 48 and 48' on the guide rail. Both cages can be of identical design, so that only the cage 36 will be described in detail, with the understanding that the same description applies to the other cage 36'.

The representative cage 36 is fabricated by pressing a strip of steel or like rigid material into the shape of a V in cross section to provide a pair of divergent web portions 84. Further, in the illustrated embodiment, the cage 36 is formed to include a flange 86 extending along one of its sides and bent approximately right angularly therefrom. The flange serves to add rigidity to the cage. As a whole, therefore, the cage 36 is of approximately Z-shaped cross section as best seen in FIG. 16. It will be understood that another similar flange could be formed along the other side of the cage. In this case the cage would have a W-shaped cross section.

The Z-shaped cross section of the cage 36 corresponds to the shape of each retainer groove 76, 76' in each end cover 30, 30'. The cage 36 is mounted just inwardly of the pair of raceways 26 on the bearing body 24 by having its opposite extremities pressfitted in the retainer grooves 76 in the end covers 30 and 30', as clearly shown in FIGS. 3 and 5.

Each of the divergent web portions 84 of the cage 36 has a slot 88 formed longitudinally therein. Each slot 88 has a width appropriately less than the diameter of the antifriction balls 34. More specifically the width of each slot 88 in the cage must be such that, rolling along one of the raceways 26 and 26' on the bearing body 24, the antifriction balls partly project inwardly through the slot into rolling engagement with the corresponding one of the raceways 48 and 48' on the guide rail 22.

The cage 36 is further formed to include a pair of tongues 90 at the opposite extremities of each slot 88. Each tongue 90 is bent away from the plane of the corresponding web portion 84 toward the guide rail 22, thereby forming an extension of one of the hairpin grooves in the end covers. As will be best understood upon inspection of FIG. 5, the tongues (therein designated 90') of the cage are intended to make possible the smooth transition of the antifriction balls 34 between the raceways on the bearing body and the hairpin grooves in the end covers.

Thus the pair of cages 36 and 36' with their tongues 90 and 90' perform the important function of guiding the antifriction balls along the raceways on the bearing body and to and from the hairpin grooves in the end covers. The rigidity and strength of the cages must be sufficiently high for that function. The steel-made cages may therefore be hardened by a suitable heat treatment.

FIG. 4 best depicts the attitudes of the pair of cages 36 an 36' when they are mounted in position on the bearing body 24, with their opposite ends engaged in the Z-shaped retainer grooves in the pair of end covers. In these working positions the cages should have the longitudinal median lines of their slots contained in the planes Y—Y of FIG. 6 and in the planes Y'—Y' of FIG. 8.

End Seals

Figure 19:
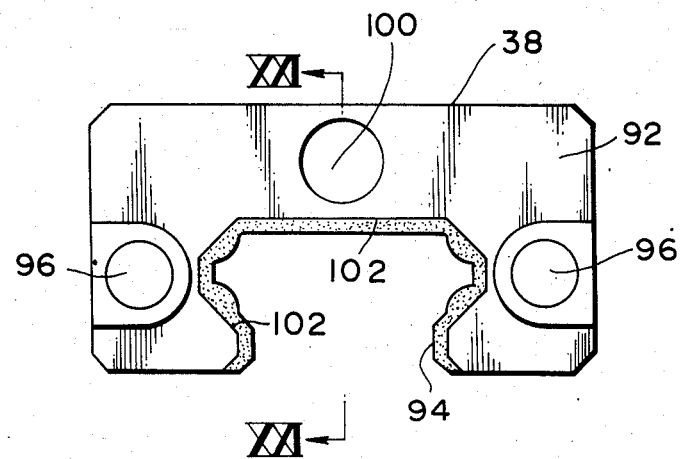
FIG. 19 is an elevation of one of the end seals of the linear bearing in the apparatus of FIG. 1.
Figure 20:
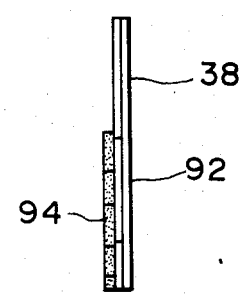
FIG. 20 is a right hand side elevation of the end seal of FIG. 19.
Figure 21:
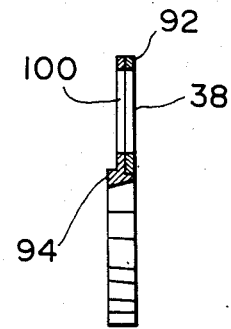
FIG. 21 is a section through the end seal, taken along the line XXI—XXI of FIG. 19.

As illustrated in detail in FIGS. 19 to 21, each of the pair of end seals 38 and 38', therein designated 38 for simplicity, comprises a holder plate 92 and a sealing strip 94 of rubber or like elastic, wear-resistant material. Made of steel or like rigid material, the holder plate 92 is shown to have the same shape and size as each end cover 30, 30'. A suitable number of mounting holes 96 are created through the holder plate 92 for the passage of fastener elements 98, FIG. 1, by which the holder plate is attached to one of the end covers 30 and 30'. Another hole 100 in the holder plate is intended for the passage of the grease nipple 82.

The sealing strip 94 is affixed to the inside edges 102 of the holder plate 92 as by baking. As clearly seen in FIG. 1, the sealing strip 94 makes sliding engagement with the head 46 of the guide rail 22 thereby preventing the intrusion of foreign matter into the linear bearing 20 through one of its ends. The other end of the bearing is of course likewise sealed by the other end seal 38'.

Side Seals

Figure 22:
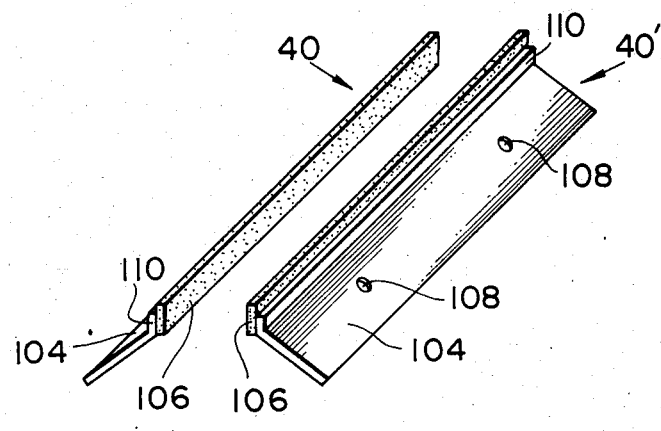
FIG. 22 shows in perspective the pair of side seals of the linear bearing in the apparatus of FIG. 1.

FIG. 22 shows in perspective the pair of side seals 40 and 40'. Each side seal comprises a rectangular holder plate 104 of steel or the like and a sealing strip 106 of rubber or the like. Each holder plate 104 has a length equal to the length of the bearing body 24 plus the total thickness of the pair of end covers 30 and 30', as will be noted from FIG. 3. At least two mounting holes 108 are formed through each holder plate 104 for the passage of fastener elements by which the holder plate is attached to the bottom of one of the depending aprons of the bearing body so as to project inwardly therefrom.

The sealing strips 106 are secured to raised rims 110 formed along the inner edges of the holder plates 104. As best seen in FIG. 4, the sealing strips 106 make sliding engagement with the opposite sides of the head 46 of the guide rail 22. Thus the pair of side seals 40 and 40' function to prevent the intrusion of foreign matter into the linear bearing 20 from the opposite sides of the guide rail.

Operation

While the operation of the recirculating-ball linear bearing apparatus is believed to be largely apparent from the foregoing, further amplification will be made in the following brief summary of such operation. In the use of the apparatus the linear bearing 20 is to be attached to a desired object, by means of fastener elements passing the mounting holes 62 in the wings 60 of the bearing body 24, which is to be moved relative to the part on which is laid the guide rail 22. As the linear bearing 20 travels in either direction along the guide rail 22, the four groups of antifriction balls 34 roll between the raceways 26 and 26' on the bearing body 24 and the raceways 48 and 48' on the guide rails 22 as guided by the pair of cages 36 and 36'. At the trailing end of the bearing the tongues 90 and 90' of the cages 36 and 36' direct the successive balls 34 into the hairpin grooves 32 and 32' in one of the end covers 30 and 30'. The load on the bearing is no longer transmitted to the balls as they flow into the hairpin grooves.

The antifriction balls 34 subsequently enter the return passageways 28 and 28' in the bearing body and travel therethrough in the same direction as the traveling direction of the bearing relative to the guide rail. Then, via the hairpin grooves 32 and 32' in the end cover at the leading end of the bearing, the balls reenter the spaces between the raceways 26 and 26' on the bearing body and the raceways 48 and 48' on the guide rail, again bearing the load on the bearing 20.

Thus, during the travel of the linear bearing 20 along the guide rail 22, the four groups of antifriction balls 34 constantly recirculate along the respective closed paths formed by the raceways 26 and 26' on the bearing body and the raceways 48 and 48' on the guide rails, the hairpin grooves 32 and 32' in the end covers, and the return passageways 28 and 28' in the bearing body. The direction in which the balls roll along these closed paths is of course subject to change depending upon the traveling direction of the bearing 20 on the guide rail 22.

Figure 23:
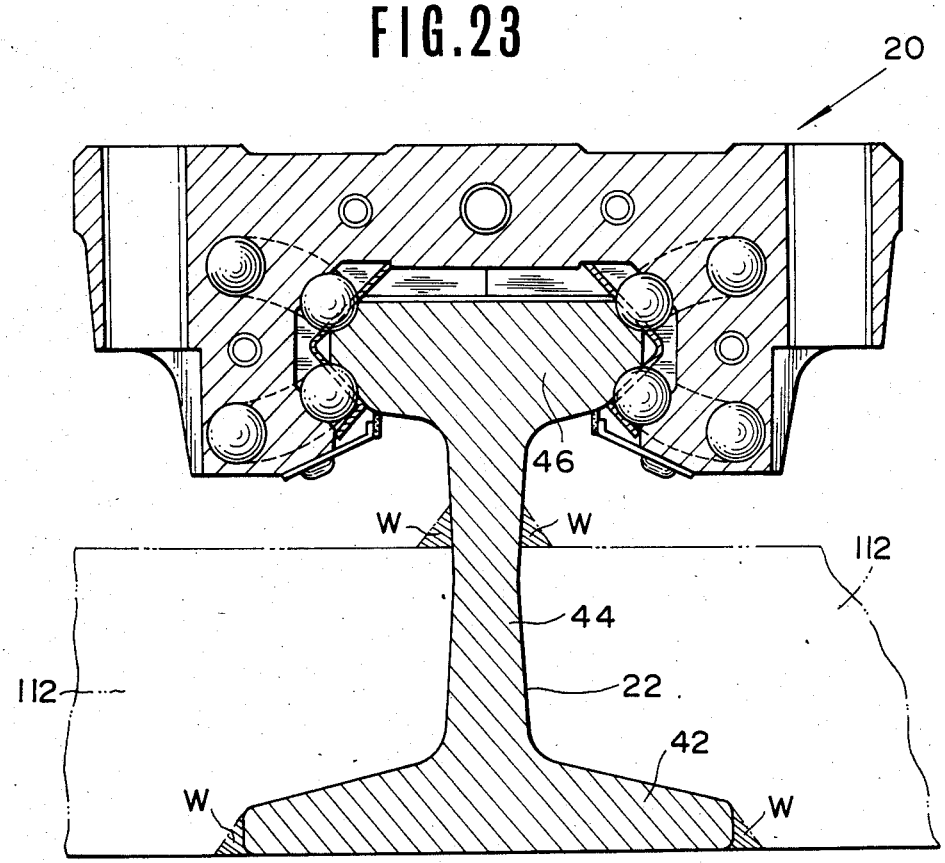
FIG. 23 is a transverse section through the linear bearing apparatus of FIG. 1, the view being explanatory of the way in which the guide rail is used as a framing or structural member of a machine or equipment external to the apparatus.

FIG. 23 is meant to demonstrate one of the advantages gained by the invention. As has been stated, the linear bearing 20 is of reduced vertical dimension and makes rolling engagement with only the head 46 of the guide rail 22, leaving its flange base 42 and web 44 exposed. Consequently, in the use of the guide rail 22 as a framing member of a desired machine or the like, other structural units 112 may be welded to the exposed flange base 42 and web 44 of the guide rail, as indicated at W. Thus the apparatus can be compactly incorporated in the machine or the like. Moreover, even if the guide rail is partly supported in midair, there is practically no possibility of it sagging under its own weight.

Other advantages offered by the invention will have become apparent from the foregoing detailed disclosure. It will, of course, be understood that various changes may be made in the form, details, arrangements, and proportions of the parts without departing from the scope of the invention as set forth in the appended claims.

What is claimed is:

1. In a recirculating-ball linear bearing apparatus capable of withstanding the load acting thereon in four orthogonal directions, comprising:
   (a) guide rail having two pairs of parallel raceways of arcuate cross section, each pair of raceways being vertically spaced, and angled away, from each other;
   (b) a bearing body of substantially inverted-U-shaped cross section mounted astride the guide rail for rolling motion along the same and having two pairs of raceways of arcuate cross section formed longitudinally thereon in opposed relation to the two pairs of raceways on the guide rail, the bearing body also having a return passageway formed longitudinally therethrough in the vicinity of each raceway thereon;
   (c) a pair of end covers secured to the opposite ends of the bearing body and each having formed therein four grooves each intercommunicating one raceway on the bearing body and one adjacent return passageway in the bearing body;
   (d) groups of antifriction balls rollably interposed between the raceways on the guide rail and the raceways on the bearing body, each group of antifriction balls being capable of recirculation along one raceway on the bearing body and through one adjacent return passageway in the bearing body which are in communication with each other via two of the grooves in the end covers; and
   (e) cage means for rollably holding the antifriction balls on the raceways on the bearing body and allowing the antifriction balls to make rolling engagement with the raceways on the guide rail;
   the improvement wherein the guide rail comprises a flat flange base adapted to be mounted to a structure, an elongated web extending upwardly from the flange base, and a head on the top of the web, the two pairs of parallel raceways on the guide rail extending longitudinally and being formed on both sides of the head; the flange base, the web and the head being integrally formed with each other and jointly serving as a rigid structural member of a building or a frame member of a machine.

2. In the recirculating-ball linear bearing apparatus as recited in claim 1, wherein each raceway on the guide rail and each raceway on the bearing body are, as viewed cross sectionally, curved with a radius approximately equal to the radius of each antifriction ball.

3. In the recirculating-ball linear bearing apparatus as recited in claim 2, wherein the planes passing the longitudinal median lines of the raceways on the guide rail and the centers of the antifriction balls thereon are each at an angle of approximately 45 degrees to the plane of the horizon, and wherein the planes passing the longitudinal median lines of the raceways on the bearing body and the centers of the antifriction balls thereon are also each at an angle of approximately 45 degrees to the plane of the horizon.

4. In the recirculating-ball linear bearing apparatus as recited in claim 1, wherein each of the pair of end covers is of substantially the same shape and size as the cross section of the bearing body and is segmented into a pair of lateral halves.

5. In the recirculating-ball linear bearing apparatus as recited in claim 4, the improvement wherein the cage means comprises a pair of cages each extending along one pair of raceways on the bearing body, each cage being in the form of a strip of rigid material bent substantially into the shape of V in cross section to provide a pair of divergent web portions, each web portion of each cage having formed therein a slot extending along one raceway on the bearing body, the slot having a width less than the diameter of each antifriction ball to allow the antifriction balls on one of the raceways on the bearing body to partly project inwardly therethrough for rolling engagement with the corresponding one of the raceways on the guide rail.

6. In the recirculating-ball linear bearing apparatus as recited in claim 5, the improvement wherein each cage has a flange formed at least along one side thereof for higher rigidity.

7. The recirculating-ball linear bearing apparatus as recited in claim 5 or 6, the improvement, wherein the cages are supported in position by having the opposite ends thereof closely engaged in retainer grooves formed in the pair of end covers.

8. In the recirculating-ball linear bearing apparatus as recited in claim 7, wherein the cage means comprises a pair of cages each extending along one pair of raceways on the bearing body, each cage being in the form of a strip of rigid material bent substantially into the shape of a V in cross section to provide a pair of divergent web portions, each web portion of each cage having formed therein a slot extending along one raceway on the bearing body, the slot having a width less than the diameter of each antifriction ball to allow the antifriction balls on one of the raceways on the bearing body to partly project inwardly therethrough for rolling engagement with the corresponding one of the raceways on the guide rail.

9. In the recirculating-ball linear bearing apparatus as recited in claim 8, wherein each cage has a flange formed at least along one side thereof for higher rigidity.

10. In the recirculating-ball linear bearing apparatus as recited in claim 8, wherein the cages are supported in position by having the opposite ends thereof closely engaged in retainer grooves formed in the pair of end covers.

11. In the recirculating-ball linear bearing apparatus as recited in claim 7, wherein each cage has a pair of tongues formed at the opposite extremities of each slot therein for the smooth rolling motion of the antifriction balls between the corresponding one of the raceways on the bearing body and the associated hairpin grooves in the end covers.

12. In the recirculating-ball linear bearing apparatus as recited in claim 1, the improvement wherein the apparatus further comprises first sealing means for sealing the opposite ends of the bearing body against the intrusion of foreign matter, and second sealing means for sealing the opposite sides of the bearing body against the intrusion of foreign matter.

13. In the recirculating-ball linear bearing apparatus as recited in claim 12, the improvement wherein the first sealing means comprises a pair of holder plates secured to the pair of end covers respectively, and a sealing strip of elastic, wear-resistant material secured to each holder plate for sliding engagement with the guide rail.

14. In the recirculating-ball linear bearing apparatus as recited in claim 12, wherein the second sealing means comprises a pair of holder plates secured to the lower ends of the opposite sides of the bearing body, and a sealing strip of elastic, wear-resistant material secured to each holder plate for sliding engagement with the guide rail.

* * * * *